United States Patent [19]
Bennett et al.

[11] Patent Number: 4,507,535
[45] Date of Patent: Mar. 26, 1985

[54] METHOD AND APPARATUS FOR PERFORATING MATERIAL

[75] Inventors: William T. Bennett, Cary; Bennie L. Parks, Durham, both of N.C.

[73] Assignee: American Brands, Inc., New York, N.Y.

[21] Appl. No.: 640,322

[22] Filed: Dec. 12, 1975

[51] Int. Cl.³ .............................................. B23K 27/00
[52] U.S. Cl. ...................... 219/121 LL; 219/121 LM; 219/121 LW; 219/384; 242/75.4
[58] Field of Search .......... 219/121 L, 121 LM, 384; 83/30, 436; 242/75.4, 65, 66, 56.8

[56] References Cited

U.S. PATENT DOCUMENTS

| | | | |
|---|---|---|---|
| 3,075,719 | 1/1963 | Hornstein et al. | 242/65 |
| 3,146,283 | 8/1964 | Da Valle | 242/56.8 |
| 3,226,527 | 12/1965 | Harding | 219/384 |
| 3,383,065 | 5/1968 | Bergeron et al. | 242/56.8 |
| 3,475,591 | 10/1969 | Fujii et al. | 219/384 |
| 3,617,702 | 11/1971 | Flournoy | 219/384 |
| 3,742,182 | 6/1973 | Saunders | 219/121 LM |
| 3,808,394 | 4/1974 | Mominee et al. | 219/121 LM |
| 3,858,821 | 1/1975 | Beard et al. | 242/66 |
| 3,915,264 | 10/1975 | Ohi | 242/75.4 |
| 3,946,960 | 3/1976 | Hunter | 242/65 |

Primary Examiner—Clifford C. Shaw
Attorney, Agent, or Firm—Pennie & Edmonds

[57] ABSTRACT

A process for perforating material comprising the steps of advancing material along a path of travel, passing the advancing material over a movable laser mask having an aperture such that the material drives the mask in unison with the movement of the material, and directing at least one laser beam through the corresponding aperture so as to vaporize the material juxtaposed the mask aperture to correspondingly form an opening in the material. The apparatus contemplated for perforating the material as it is advanced along a path of movement comprises first means for advancing the material along the path of movement, second means having at least one aperture and being operatively associated with the first means for enabling the perforation of the material as it is advanced along the path, and for being driven by and in unison with the advancing material, and third means operatively associated with the second means for vaporizing material juxtaposed said aperture.

29 Claims, 5 Drawing Figures

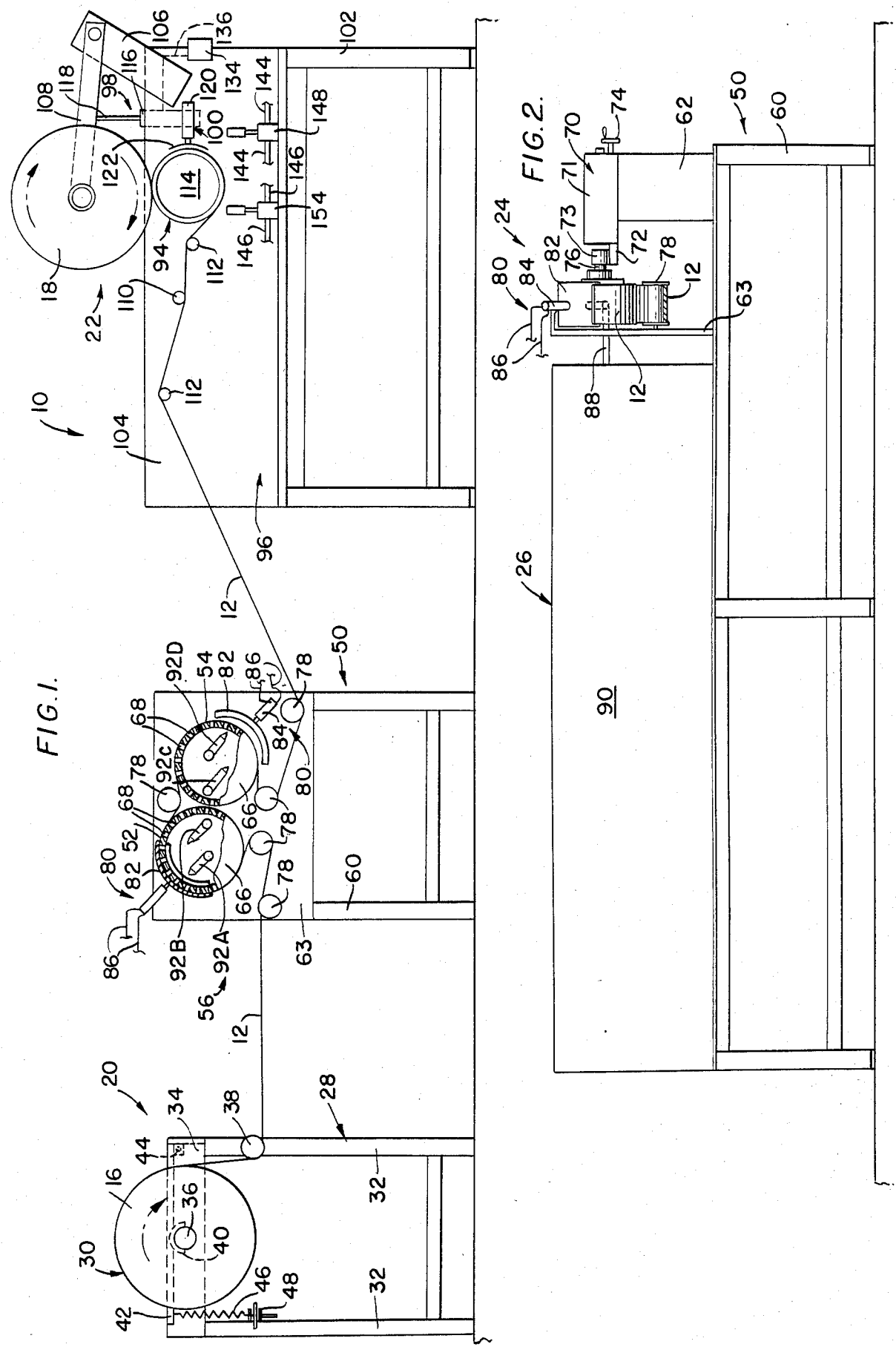

METHOD AND APPARATUS FOR PERFORATING MATERIAL

BACKGROUND OF THE INVENTION

1. Field of the Invention

In general, this particular invention pertains to perforating material. Specifically, it is directed to a novel and improved process and apparatus for accomplishing such process whereby material, such as cigarette tipping paper, is perforated by laser beams for producing a multiplicity of apertures in the tipping material.

2. Description of the Prior Art

In the tobacco industry, it is rather common practice to perforate cigarette tipping paper in order to produce a plurality of openings therein. Such openings generally serve the purpose of controlling the main stream delivery of cigarette smoke constituents. By controlling the main stream of delivery of smoke constituents, such properties, as tar and nicotine levels, can be advantageously regulated. Should, however, the openings be irregularly and/or partially formed, such makes reasonably accurate control of the constituents more difficult to obtain. As a consequence thereof, the openings would fail to effectively perform in the manner intended. It will be recognized, of course, that if effective and accurate control of cigarette smoke constituents is to be accomplished, such openings should be accurately formed and spaced apart. Moreover, such accuracy is important from the standpoint of providing and maintaining the desired level of cigarette smoke constituents. For example, if smoke constituents exceed an amount represented by a manufacturer, such manufacturer might to subject to government sanctions. It will be appreciated, therefore, that there is an emphasis upon achieving the proper and accurate formation of openings in the tipping paper, since it, in turn, controls the main stream delivery of cigarette smoke constituents.

There are several known prior art approaches for perforating material, such as cigarette tipping paper. Such known perforating methods include use of mechanical pins, electrical sparks, and lasers. Of the foregoing methods, use of mechanical pins has been generally widely adopted throughout the industry for achieving such perforation. Essentially, mechanical pins serve to actually puncture or perforate the material they cooperate with. In actual practice, however, it has been commonly experienced that mechanical pins are relatively complicated and cumbersome in use. Another drawback encountered is that the pins are frequently subject to mechanical failure which results in no opening or perforation. Apart from the foregoing shortcomings, mechanical pins frequently do not cleanly perforate openings in the intended manner since, in many instances, what normally occurs is that the tipping paper being punctured by the pins actually tears. Such tearing results in ragged edges which have a tendency to close up the intended openings as the paper is wound in the usual manner. As can be appreciated from the foregoing brief description there are numerous disadvantages associated with the application of mechanical pins for perforating extremely small openings in the tipping paper. Accordingly, less than entirely satisfactory openinqs are provided.

As concerns the less widely used electric sparking technique, such serves to actually burn apertures in the paper. The significant disadvantages associated with this particular technique are a charred appearance produced about the periphery of the formed apertures and, in addition, irregularly formed apertures. Accordingly, there is a tendency for not only a non-aesthetic appearance but, also, non-uniformity in size and spacing of the apertures. Consequently, a less than effective means is provided to control the formation of apertures in the tipping paper so as to correspondingly more accurately control the main stream delivery of cigarette smoke constituents.

As previously observed, laser apparatus have been employed in a wide variety of situations for purposes of perforating numerous materials including cigarette tipping paper. Generally speaking, though, heretofore known approaches to perforate material, particularly in those situations where such material is continuously advanced in a predetermined path, are subject to several significant disadvantages. One example of such type of known laser technique is basically disclosed in U.S. Pat. No. 3,808,394. As therein described, a pulsating form of laser beam is directed towards a rotating mirror which, in turn, reflects the beam of laser energy towards an opening in an independently rotating drum. The laser beam serves to vaporize the material adjacent the opening for correspondingly forming an aperture in the advancing material. Such prior art approach, however, suffers from the shortcoming of requiring quite expensive electrical components to produce the pulsating energy necessary to perforate the material. Additionally, this particular approach is unable to effectively ensure uniformity of spacing of the holes because it does not compensate for varying rates of speed as the material is advanced since the drum is responsible for driving the material.

It is known in the laser field to form a plurality of perforations in a sheet of material through appropriately scanning a laser beam across the sheet. Normally, with such an approach the laser beam scans the material and is then stopped for purposes of accurately aligning the beam at the particular desired location so as to enable the beam to form a corresponding perforation. From the foregoing, it becomes evident that should a large number of perforations be formed in a mass production situation, such approach would be extremely time consuming and costly considering not only the amount of time involved but, also, the complex arrangement and expense of equipment necessary for performing the scanning and pulsing of the laser head in prescribed intervals of time.

One prior art attempt to partially overcome the above enumerated drawbacks associated with perforating a plurality of discrete apertures is through the utilization of a laser mask having a number of apertures through which a laser beam passes for forming corresponding perforations. By way of specific example, such a laser mask arrangement is disclosed in U.S. Pat. No. 3,742,182. In the above referenced patent, it is described that by reason of such mask a faster technique is developed since the laser beam can be scanned across the holes of the mask without having to stop for each hole and be accurately aligned in the desired position. Nevertheless, there are significant disadvantages associated with this particular technique inasmuch as expensive and complicated mechanical arrangements must also be utilized to achieve the relative scanning movement of the laser with accuracy. Furthermore, the foregoing category of laser perforating arrangement is unable, without extremely expensive control systems, to provide uniformity in the spacing of perforations should the speed of the relatively moving material to the mask vary during a particular time span. Accordingly, the preceding described system is less than satisfactory for many applications, particularly in high speed applications requiring precise alignment and formation of perforations in the material regardless of fluctuations and interruption in the continuous advancement of material.

While, as previously noted, there have been efforts in the tobacco industry to utilize laser beams for purposes of perforating cigarette paper and, in particular, tipping paper, the heretofore known attempts have failed to provide a highly accurate, reliable and inexpensive solution. Several reasons contribute to such lack of success. Foremost among the problems is the fact that tipping paper is normally produced in rather wide parent rolls. Frequently, such rolls are about 44 inches in width, however, in practice the width depends upon the width of the press the paper is printed on. Typically, though such parent rolls are exceedingly wide especially in comparison to the width of the conventional bobbins cut therefrom. The present practice in the art is to have the tipping paper initially perforated by virtue of mechanical pins and then subsequently slit into approximately sixteen bobbins, with each bobbin containing a sufficient width for two cigarette tips. From a consideration of the preceding, it will be appreciated that should conventional laser perforating methods and apparatuses be applied for obtaining two sets of perforations in each bobbin, the equivalent of 32 cigarettes, a minimum of 32 laser beams would be required. If it were desired to have multiple rows in each cigarette tip, then 64 laser beams would be necessitated. Moreover, in such a situation the beams must be precisely aligned and in certain circumstances the beams would be spaced as close as 1 mm.

Apart from the enormously complicated engineering problems which undoubtedly would be encountered in installing so many laser heads and in properly aligning the laser beams for perforating, given the state of the art in perforating and slitting parent rolls of tipping paper, the costs factors involved would also result in a process and mechanical arrangement unacceptable for commercial utilization.

Additionally, should a laser beam be scanned across the tipping paper and pulsed in order to achieve perforations of the cigarette tipping paper, the attendant costs would also be commercially unreasonable.

Moreover, another of the disadvantages associated with the application of laser beams to advancing material is that laser pulsing is normally established for a given particular speed. Therefore, should variations occur in the speed of the advancing material, such as during the ordinary start-up and shut-down speeds experienced in many applications, the standard types of aforenoted laser arrangements would be unable to, without expensive and relatively sophisticated techniques, successfully maintain the desired uniformity of perforation spacing. In regard to cigarette tipping paper with about 3000 meters of such paper normally being started and stopped, the tendency for non-uniformity of spacing is significant. Accordingly, a substantial quantity of paper would not have the apertures uniformly spaced.

Finally, whereas the use of a mask can eliminate the problems associated with scanning the laser head or pulsing the laser beam, there remains the problem of driving the mask and the material together uniformly at varying speeds.

As can be appreciated from the foregoing general description relating to known methods and apparatuses for use in perforating paper, and, in particular, tipping paper for cigarettes, none have been able to successfully, economically and with uniformity perforate paper through the use of laser beams.

SUMMARY OF THE INVENTION

Accordingly, in light of the several noteworthy shortcomings associated with conventional methods and apparatuses for perforating paper, as mentioned in the foregoing general description, it is, therefore, an object of the present invention to overcome such noted disadvantages by providing a novel and improved laser perforating method and apparatus for simply, successfully, reliably and economically perforating material including cigarette tipping paper.

Briefly, in accordance with the present invention there is envisioned a process for perforating material comprising the steps of advancing at least a sheet of material along a path of travel, passing the advancing material over a movable laser mask having an aperture such that the material drives the mask in unison with the movement of the material, and directing at least a laser beam through the corresponding aperture so as to vaporize the material juxtaposed the mask aperture to correspondingly form an opening in the material.

In one preferred mode, there is contemplated a simple and reliable process for perforating cigarette tipping paper. Such process for perforating cigarette tipping paper is unlike that characterizing prior art approaches for perforating tipping paper since it comprises the steps of advancing a web of tipping paper generally having the width of a single bobbin of tipping paper along a path of travel, passing the advancing web of paper over a rotatable laser mask having an aperture such that the web rotatably drives the mask in unison with the movement thereof, and projecting at least one continuous laser beam through the corresponding aperture so as to vaporize the web of tipping paper juxtaposed the mask aperture to correspondingly form an opening in the tipping paper, each time the aperture passes the laser beam.

The apparatus for accomplishing the process of perforating material as it is advanced along a path of movement comprises first means for advancing the material along the path of movement. Such apparatus includes second means having at least one aperture and being operatively associated with the first means for enabling the perforation of the material as it is advanced along the path, and for being driven by and in unison with the advancing material. Also envisioned by the present invention are third means operatively associated with the second means for vaporizing material juxtaposed the aperture. In a preferred embodiment the second means includes a hollow cylindrical mask having a plurality of apertures and the third means is comprised of stationary laser means within the hollow mask which projects at least one laser beam to said aperture, such that the laser beam vaporizes the material juxtaposed the apertures successively moving past the beam in response to advancement of the hollow mask.

BRIEF DESCRIPTION OF THE DRAWINGS

The above, as well as other objects, features and advantages of the present invention will become readily apparent upon a reading of a detailed description thereof taken in conjunction with the accompanying drawings, wherein like reference numerals indicate like structure throughout the several views.

FIG. 1 is a side elevational view of a perforating apparatus embodying the principles of the instant invention with portions removed for greater clarity in depicting the several components;

FIG. 2 is an elevational view illustrating certain structure in greater detail;

DETAILED DESCRIPTION

Figure 3:
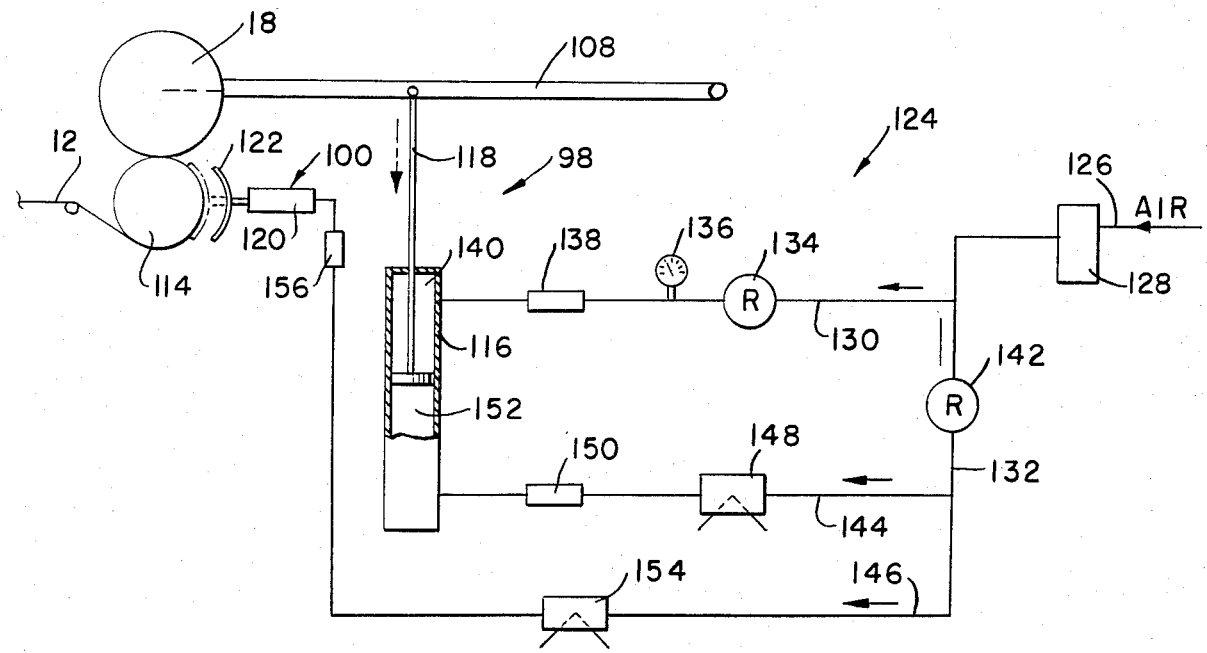
FIG. 3 is a schematic illustration of the fluid circuitry used in connection with the perforating apparatus shown in FIGS. 1 and 2.

Referring to FIGS. 1 to 5 of the drawing, there is best depicted a preferred embodiment of the perforating apparatus made in accordance with the principles of the present invention and being generally designated by reference numeral 10. Although the succeeding description is primarily directed to continuously perforating sheets of cigarette tipping paper 12 so as to form a multiplicity of openings 14 therein, it is well within the spirit and scope of this invention that other types of sheet-like material may be advantageously perforated. As will be presently mentioned and described more clearly, a web of such cigarette tipping paper 12 is perforated with laser energy as it continuously advances along a path from supply reel or bobbin 16 to rewind reel or bobbin 18. Such single bobbin 16 may have any desired diameter and have a suitable width for about two cigarettes. The particular significance of which will be presently described.

By virtue of utilizing a single bobbin of tipping paper, the present invention provides a significantly enhanced arrangement which advantageously adapts itself to laser perforating of such tipping paper. Specifically, by perforating a single bobbin, as opposed to perforating an entire parent roll and then slitting such parent roll, such approach forecloses the necessity of having numerous complicated and expensive components of laser systems, which would otherwise be required if known laser technology were to be applied in the conventional fashion for perforating tipping paper at a number of preselected locations along the extent of its width. Moreover, utilization of a single bobbin of tipping paper avoids the necessity of assembling and accurately aligning the laser equipment across the parent roll. It should, of course, be emphasized that precise location of the laser beams is extremely important, particularly in those situations wherein laser masks are employed. Misalignment of the beams would naturally result in the undesirable features of incomplete and non-uniform spacing of such apertures.

To more fully appreciate the significance of the aforenoted particular approach in the context of perforating cigarette tipping paper, it will be again noted that parent rolls frequently are 44 inches wide and have such paper perforated and appropriately slit to form about sixteen perforated bobbins. It being understood that each bobbin may have a dimension which is equivalent to about two cigarette tips. Accordingly, about thirty-two cigarette tips would be produced with such a parent roll. Mention should be made at this particular point that in industry, these parent rolls vary in dimensional width. Similarly, the width of respective bobbins of tipping paper vary depending upon the size of the cigarette tips to be produced. For instance, widths in the range of from 40 mm. to 80 mm. are not uncommon. Given the above circumstances, it is evident that if each tip is to have a single row of perforations, a minimum of thirty-two laser beams would be required. Should multiple rows of perforations be desired for individual tips, a minimum of sixty-four laser beams would be required. Obviously, there are significant cost factors, as well as enumerable engineering difficulties attendant with the precise installation and operation of the laser equipment. As a consequence thereof, such would result in a commercially impractical technique. Although the preceding description is directed toward the use of a single bobbin of tipping material, it will, of course, be readily appreciated that in the broader aspects of this invention, the width of the bobbins may vary depending on the feasibility of advantageously deploying a suitable number of laser beams within a given width. As used throughout the description of this invention, however, the term single bobbin of tipping material refers to what is commonly referred to in this particular field as a bobbin having a width which normally accomodates an equivalent of from about one to two cigarette tips.

Essentially hereinafter described, perforating apparatus 10 comprises unwinding assembly or means 20, rewinding assembly or means 22, masking means 24 and laser apparatus or means 26.

In connection with the unwinding assembly 20, reference is made, in particular, to FIG. 1. To facilitate an understanding of perforating apparatus 10, it will be appreciated that the components forming the unwinding assembly 20 are constructed and assembled in known fashion. Hence, a description of only those components necessary for an understanding of the present invention will be discussed. Basically though, unwinding assembly 20 includes support frame 28, and tension control means or arrangement 30. Frame 28 includes upright legs 32 and transverse frame support member 34 interconnecting the legs. A rotatable shaft 36 laterally protrudes from and is suitably journalled for rotation with respect to frame member 34. Bobbin 16 is rotatably mounted on shaft 36 in a cantilevered position with respect to frame 28. The significance of this particular mounting will be presently mentioned. Also, an idler roll 38 is fastened to one of the upstanding support legs 32 for cooperating with the web of paper 12 so as to enhance the continuous advancement of such paper in a known fashion.

Tension control means 30 is basically comprised of brake shoe and disc device generally depicted by reference numeral 40, braking arm 42, brake arm pivot 44, spring 46 and handwheel mechanism 48 for brake adjustment. The brake shoe and disc device 40 engages shaft 36 for applying varying amounts of braking force thereto. In this manner, the tension in the advancing paper web 12 can be applied. Brake shoe 40 is attached to brake arm 42 which, in turn, is pivotally connected, as at pivot 44, to transverse support member 34. Spring 46 is connected at one end to the terminal end of brake arm 42. The opposite end of spring 46 is appropriately fastened to handwheel mechanism 48 which, in turn, is secured to one of the support legs 32. By virtue of the foregoing arrangement, suitable adjustment of handwheel 48 increases or decreases the force applied by spring 46 on arm 42. In such fashion, the brake shoe 40 which is conjointly movable with arm 42 can correspondingly increase or decrease the amount of braking pressure applied to shaft 36 to thereby vary the tension applied to paper web 12. In this embodiment, it should be emphasized that the tension actually imparted to the web 12 should be selected such that the paper will not slip relative to masking means 24, for reasons subsequently made clear.

As the web of paper 12 continuously advances along its path of movement, as noted more clearly in FIG. 1, it will be passed to masking means 24, and laser means 26 for purposes of having a predetermined pattern of openings 14 formed therein through the application of laser energy.

Figure 4:
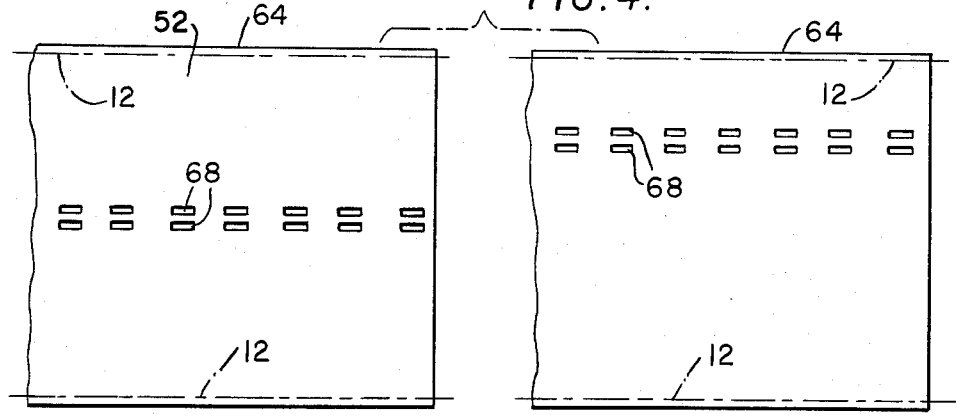
FIG. 4 illustrates a pair of enlarged flat development segments of corresponding cylindrical masking members depicting a particular pattern of openings therein as well as the arrangement of such openings with respect to each other and a web of advancing paper superimposed thereover; and, FIG. 5 is a perspective view illustrating the cooperation between a laser mask, advancing web of paper and laser arrangement.
Figure 5:
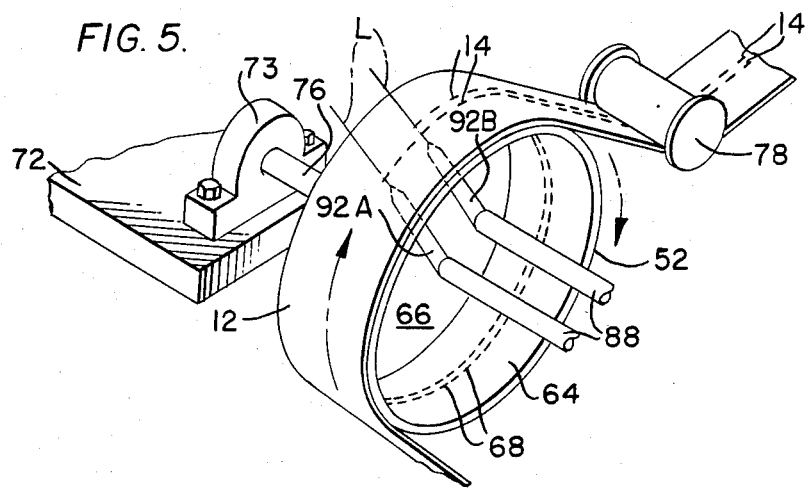

As more clearly shown in FIG. 1, taken in conjunction with FIGS. 2, 4 and 5, masking means 24 includes masking supporting means 50, a pair of first and second masking members 52 and 54, respectively, guiding and tensioning means 56, and masking adjusting means 58 mechanically connected to both of the masking members 52 and 54.

Particularly referring to FIGS. 1 and 2, the masking support means 50 is comprised of a generally elongated and sturdy support table 60, and support member 62 is rigidly secured to support table 60 in an upstanding fashion and to masking adjusting means 58 for purposes of properly supporting the latter as well as the first and second masking members 52 and 54, respectively. Support means 50 also includes an upstanding support plate 63 which is generally axially spaced apart from the ends of masking members 52 and 54. It is contemplated by this invention that support table 60 not only support masking members 52 and 54 but, also laser means 26. Through mounting both masking members 52 and 54, as well as laser means 26 on a common support, the possibility of having laser beams misaligned with respect to the masking members 52 and 54, by reason of vibration will be substantially avoided. Consequently, a more accurate and precise manner is provided for ensuring the constancy of proper alignment between laser beams and the respective masking members 52 and 54.

Each of the masking members 52 and 54 is defined by a generally cylindrical hollow drum having an open end 64 and closed end 66. Of course, other configurations for the masking members are contemplated within the spirit and scope of this invention. Masking members 52 and 54 are made of a suitable masking material which may be employed for use in conjunction with laser beams L. Since both masking members 52 and 54 are substantially identical except as hereinafter made evident, only one has been illustrated in FIGS. 2 and 5. A plurality of apertures 68 are formed in and circumferentially spaced about each of the masking members 52 and 54. As illustrated in FIG. 4, there is depicted one preferred arrangement for the formation and spacing of apertures 68 for purposes of perforating cigarette tipping material 12. It will be noted that apertures 68 on each of the masking members 52 and 54 are arranged in a closely spaced apart parallel fashion with respect to each other. It will be further observed with reference to FIG. 4, that the pair of circumferentially spaced apertures 68 on masking member 52 is spaced further from its top or open end 64 in comparison with the pair of spaced apertures formed on masking member 54. The particular significance of the illustrated arrangement of apertures 68 has been determined to enable the satisfactory perforation of tipping material 12 as it advances from supply bobbin 16.

As earlier mentioned, a single bobbin 16 of tipping material is typically employed for use in making cigarette tipping for two cigarettes. The foregoing described relationship of apertures 68 will achieve the formations of multiple rows of openings 14 in the paper web 12 sufficient for two cigarette tips. However, such relationship is given for purposes of illustration and should not be construed other than as one preferred arrangement of apertures, since other arrangements can be provided for without departing from the principles of the instant invention. Moreover, the present invention envisions that each of the masking members can be appropriately replaced by other similar types of masking members to effect a change in the pattern of apertures used for perforating.

Although the preceding description has essentially described two individual masking members other suitable numbers can be provided for and yet remain within the scope of this invention.

As more clearly shown in FIGS. 2 and 5, masking adjusting means 58 includes a conventional linear slide table mechanism generally indicated by reference numeral 70. It should be noted that linear motion slide table mechanism 70 is constructed and assembled in well-known fashion. Consequently, only those portions thereof necessary for an understanding of the present invention will be described. As shown in FIG. 2, slide table mechanism 70 is connected to upstanding support 62. Such mechanism 70 includes housing 71 with a forwardly positioned slide plate 72 having operatively connected thereto two similar pillow type bearing blocks 73, only one being illustrated, and handwheel 74. In a conventional manner, the forward slide plate 72 is relatively axially displaceable in forward and rearward directions in response to actuation of handwheel 74 in a known manner. Each of the masking members 52 and 54 has attached to the closed end thereof a shaft 76. Respective ones of the shafts 76 are appropriately connected to a respective bearing block 73. Each bearing block 73 enables rotation of the respective masking members 52 and 54 relative thereto. As noted, since both the masking members 52 and 54 and bearing blocks 73 are substantially the same, only masking member 52 and pillow block 73 has been shown in FIG. 2. It will be appreciated that, through the foregoing arrangement, both masking members can be freely rotatably driven relative to the stationary bearing pillow blocks 73, in response to being driven by paper web 12. The particular significance of such operation will be subsequently set forth in somewhat more detail. Moreover, it will be appreciated that upon axial displacement of slide plate 72 in response to operation of handwheel 74, shafts 76 will correspondingly effectuate axial displacement of both masking members 52 and 54. As a consequence thereof, the apertures of such masking members are enabled to be precisely located with respect to the laser beams L. Additionally, the present invention envisions that slide table mechanism 70 be provided with, in a known manner, precise micrometer type incremental settings for purposes of accurately regulating the axial displacement of the masking members. In this manner, a versatile arrangement is provided which facilitates the accurate placing of the masking members.

As mentioned, paper web 12 serves to constantly and continuously drive both rotatable masking members 52 and 54 in unison therewith. To ensure such driving motion there must exist sufficient wrap of the paper web 12 about the masking members 52 and 54. Towards the foregoing end, this embodiment includes guiding and tension mounting means 56. In the instant embodiment, guiding and tension mounting means 56 is defined by a plurality of well-known types of guide rolls 78. Each of such guide rolls 78 are connected, in a conventional fashion, to vertical support plate 63 and assume cantilevered positions with respect to such plate. The guide rolls 78 mounted on vertical plate 63 are positioned relative to each other as well as masking members 52 and 54, consistent with sound engineering practice, to maintain the tension imposed on paper web 12 by tension control means 30. Essentially, the guide rolls 78 not only prevent lateral shifting of paper web 12 relative to the masking members 52 and 54 but, also, importantly maintain the proper tensioning of web 12 so as to provide sufficient wrap about the masking members. Through such an arrangement, the web 12 can properly drivingly rotate the masking members 52 and 54.

With lateral displacement of web 12 controlled, such web can pass over the apertures 68 such that the intended openings 14 can be properly formed. This is important, since as noted, the precise location of such openings in the cigarette tipping paper is extremely significant.

Masking means 24 further includes safety shielding means 80. As perhaps best illustrated in FIGS. 1 and 2, safety shielding means 80 is basically comprised of a pair of generally curved U-shaped channel shield members 82. Each of the shield members 82 is associated with respective ones of the masking members 52 and 54, respectively, so as to shield against the laser beams in a known manner. Safety shielding means 80 also may include a known type of hydraulic or pneumatic cylinder 84 fixedly attached in a known manner to each shield member 82 and to plate 63. The hydraulic cylinders 84 move the shield members 82 between a shielding position, or extended position, such as illustrated by the topmost shield member indicated in FIG. 1, to a nonshielding or retracted position, such as more clearly denoted by the lower shield member in FIG. 1. Electrical leads 86 electrically interconnect the hydraulic cylinder 84 to the laser means 26, in a conventional fashion, so as to have the hydraulic cylinders 84 interlocked with laser means 26, in a known manner, so as to enable retraction of the shield members 82 to the non-shielding position whenever the laser beams are inoperable, and to extend the shield members 82 to the shielding position, whenever the laser means 26 emits laser beams. It will also be understood that whenever the shield members 82 are in the retracted position, an operator may easily thread the paper web 12 onto the respective masking members 52 and 54 as well as remove the same. It has been determined that the generally curved U-shaped channel shield members effectively operate for the purposes intended with a cylindrical mask.

Specifically, referring to FIG. 1, taken in combination with FIGS. 2 and 5, the laser means 26 is more clearly illustrated. Such laser means 26 is formed of conventional components and operates in a known manner. Therefore, to facilitate a proper understanding of its relationship with the present embodiment only those components necessary for an understanding of this invention will be given.

As more particularly shown in FIG. 5, respective ones of the laser beams L are projected towards the apertures 68 so as to vaporize the paper web 12 which is juxtaposed the exterior surface of the masking members. The present invention envisions use of a continuously propagated laser beam L. The advantages associated with a continuous beam as opposed to a pulsed beam is that less expensive equipment is required. This is a significant factor especially in circumstances wherein profit margin is slight. While the present invention prefers the utilization of a continuous beam, such invention also contemplates use of a non-continuous beam.

As denoted laser projections 88 extend from the laser apparatus 90 through open end 64 of the respective masking members and plate 63. Transversely disposed with respect to the outer ends of each of such projections 88 are conventional laser heads 92A to D (FIG. 1). It will be noted that a pair of laser heads 92A and 92B are disposed within the hollow portion of masking member 52 whereas, laser heads 92C and 92D are suitably disposed within masking member 54. Each one of the respective heads 92A and 92B are axially spaced with respect to the other so as to enable the corresponding heads to project a laser beam L toward a corresponding series of the circumferentially spaced apertures 68 formed in the masking member 52. Accordingly, the respective laser heads will cooperate with corresponding ones of the parallel pair of apertures 68. Likewise, laser heads 92C and 92D are similarly axially spaced relative to each other such that the laser beams emitted therefrom will be able to be precisely aligned with respect to the apertures 68 in masking member 54.

By virtue of the foregoing constructional arrangement, it will be evident that whenever the laser heads, as for example 92A and 92B emit their laser beams L, such beams will correspondingly communicate with successive ones of the apertures 68 formed in the appropriate masking member as the latter rotatably advances. Since the web 12 is juxtaposed the masking members 52 and 54 the beams L will vaporize the paper in those areas immediately adjacent the apertures 68 so that openings 14 are correspondingly formed in the paper, such as illustrated in FIG. 5. Since the masking members 52 and 54 rotate in unison with paper 12 there is no need for having the laser heads 92A-D scan the paper, as is quite conventional with a number of contemporary laser scanning apparatuses. Accordingly, substantial savings are afforded through this particular arrangement.

Moreover, since the paper 12 continuously drives the masking members 52 and 54 in unison with the advancement of paper the usual difficulties encountered with variances in advancement speed during the speed-up and slow-down of the paper 12 as it travels from supply bobbin 16 to rewind bobbin 18 are eliminated. Such relationship is significant from the standpoint that an extremely inexpensive arrangement is provided which enables uniform perforating of openings 14 in the paper 12, notwithstanding the speed of material. Also, since the weight of the paper effects speed of advancement, the foregoing arrangement enables perforating apparatus 10 to successfully facilitate perforating materials having different weight without the attendant shortcomings associated with expensive or complicated equipment that would have to be reset for particular sheet and mask advancement speeds.

Besides the simplicity and savings which would be accomplished through the aforenoted constructional arrangement and method, additional economic savings will result by virtue of the laser beams L being emitted in a continuous fashion. As indicated earlier, with a continuous laser beam there would be no need for the rather expensive equipment which is ordinarily utilized to chop the laser beams to provide for a plurality of perforations.

It will be at once appreciated that since a single width bobbin of tipping material is being utilized a laser arrangement need not be provided for an entire parent roll. This approach of having the parent roll slit into corresponding bobbins and then having individual bobbins perforated in the above described manner, is a reversal of and in contrast to the widespread industry practice of perforating the material and then slitting such into the respective bobbins. The present invention represents a significant simplification for perforating tipping material with lasers, since the complicated engineering problems and significant cost factors which would be involved in substituting laser beams for mechanical pins in perforating the material on the parent roll would be eliminated.

After successfully perforating openings 14 in paper web 12, such paper is continuously advanced to rewinding means 22. With regard to the operation of the rewinding means 22, reference is made in particular to FIG. 1 taken in conjunction with FIG. 3. As envisioned by the instant invention, such rewinding means 22 includes driving means 94, frame means 96, tension maintaining means 98, and holding means 100. In connection with frame means 96 it basically includes table support 102 having connected thereto upwardly extending vertical support plate 104, bobbin support member 106, and bobbin pivot arm 108. The support member 106 is rigidly secured at an incline to support plate 104. Pivotally attached to the top of member 106 is pivot arm 108. Rewind bobbin 18 is conventinally rotatably mounted to the free end of arm 108 and is permitted to pivot upwardly and downwardly for well known reasons afterwards made clear. In addition, frame means 96 includes guide roll 110 and idler rolls 112. Both the guide roll 110 and idler rolls 112 are suitably connected to vertical plate 104 in a generally cantilevered position and serve to properly advance paper web 12. The purpose of such cantilevered arrangement will be mentioned presently.

Driving means 94 of this embodiment includes a driving roller 114 which is effective to provide the driving force necessary for advancing paper web 12 from the supply bobbin 16 to the rewind bobbin 18. Such roller 114 is driven by a variable speed motor (not shown) mounted on and supported by a horizontal support plate.

Reference is now made to tension maintaining means 98. In normal operation, the rewind bobbin 18 will contact the web of paper 12 and press the same against the driving roller 114. Essentially, tension means 98 applies a constant downward force to the bobbin 18 which, in turn, effects a constant pressure or force on web 12 against driving roller 114. Such pressure is selected so as to prevent back slippage and maintain the desired tension on paper 12 which was set by tension control means 30. As more clearly illustrated in FIGS. 1 and 3 tension maintaining means 98 comprises a fluid cylinder 116 which is suitably fastened to plate 104 and has a vertical displaceable rod 118 fixedly attached to pivot arm 108. As will be subsequently described in greater detail, the cylinder 116 is charged with fluid so as to apply a downward force on pivot arm 108. Accordingly, rewind bobbin 18 maintains, under constant pressure, paper 12 in engagement with driving roller 114 for the purposes noted previously.

During normal operation as the size or diameter of rewind bobbin 18 increases due to wrapping of several convolutions of paper 12 therearound, pivot arm 108 will, accordingly, rise. However, as will also be later described tension maintaining means 98 is effective to maintain a sufficient downward pressure on the paper 12 against driving roller 114 so as to maintain the tension necessary for effectively advancing the material. Consequently, the proper tension to prevent slippage of paper 12 is continuously maintained during such operation.

In the embodiment being illustrated, holding means 100 comprises a single acting fluid cylinder 120 suitably secured to plate 104. Holding member 122 is mechanically connected to fluid cylinder 120 and has a generally C-shaped configuration. Such configuration facilitates holding of the web of paper 12 against the driving roller 114. Holding member 122 is movable between extended and retracted positions. In the extended position, holding member 122 will contact paper web 12 and hold it against driving roller 114 so as to maintain tension on the web 12 at both supply and take-up ends, and also to prevent slack in such paper. This is particularly necessary whenever the rewind bobbin 18 is being replaced. If slack occurs, then slippage can occur between the material and mask thus causing variation in aperture spacing. Consequently, proper tension will be maintained, regardless of the fact that rewind bobbin 18 will be replaced.

Now referring to FIG. 3, there is diagrammatically represented a fluid circuit 124 which may be used to accomplish the foregoing operations of the tension maintaining means 98 and holding means 100 in a convenient, simple and reliable manner. In this embodiment, a suitable supply of pressurized air may enter line 126 and travel through a conventional air line filter 128. From filter 128, a pair of fluid lines 130 and 132 branch off. Fluid line 130 leads to and through a conventional form of relieving type air line regulator 134, a well-known kind of gauge 136, a standard form of flow control valve 138 and into the top chamber 140 of the fluid cylinder 116. This permits a suitable amount of pressurized fluid to enter the top chamber 140 so as to drive piston rod 118 downwardly. By reason of such operation, pivot arm 108 is also moved downwardly. Such downward movement results in bobbin 18 applying a suitable constant pressure on web 12 against driving roller 114 so as to maintain sufficient driving tension on the web to prevent slippage.

During upward pivotal movement of pivot arm 108, the piston rod 118 will rise to thereby force the fluid from chamber 140 by reason of regulator 134 being of the relieving type. The regulator 134 can be adjusted to control the bleed from chamber 140.

Fluid line 132 passes through a conventional kind of air regulator 142. From air line regulator 142 another pair of fluid passages 144 and 146 branch off therefrom. Fluid line 144 fluidically communicates with three-way manual control valve 148 and flow control valve 150 as it enters the bottom chamber 152 of air cylinder 116. Through suitable manipulation of control valve 148, the lower chamber 152 can be pressurized to raise piston rod 118 in those instances wherein the rewind bobbin 18 will be replaced. During this particular situation, the bobbin 18 will not contact the paper 12. Therefore, the tension would not be maintained on the paper 12. It is under these circumstances that the holding means 100 will be operated to hold the tension on web 12. Towards this end of operating holding means 100, fluid line 146 is connected to a second three-way manual valve 154 which is connected to air cylinder 120 through conventional fluid control valve 156. Cylinder 120 will be operated, in a known manner, through operation of control valve 154. Thus, fluid pressure from line 146 will actuate cylinder 120 to force retaining member 122 against driving roller 114 and paper 12. Of course, deactuation of cylinder 120 is also accomplished through suitable actuation of control valve 154.

While the preceding fluid circuit has been described for purposes of effectuating the foregoing operation of maintaining constant tension to be applied towards the web material as well as to enable operation of a holding force to facilitate replacing a bobbin, it is certainly within the spirit and scope of this invention that other types of suitable arrangements may be conveniently employed for purposes of achieving and accomplishing the foregoing operations. As mentioned, the guide rolls, bobbins, and masking members are cantilevered. It has been determined that by having a cantilevered arrangement threading of the web 12 is significantly improved.

Having thus described the aforenoted constructional arrangement of a preferred embodiment of method and apparatus, it is believed that such operation is evident therefrom. To supplement the description, however, it will be understood that such method in a preferred mode comprises the steps of unwinding at least a sheet of the material from a supply reel along a path of travel, tensioning the material as it unwinds from the supply reel, advancing the material over at least one generally hollow cylindrical laser mask having a plurality of circumferentially spaced apertures such that the material rotatably drives the mask in unison with the movement of the material, guiding and tensioning the material over the laser mask as it advances along the path of travel, directing at least one stationary and continuously applied laser beam from within the hollow mask toward the corresponding apertures so as to vaporize the material juxtaposed each of the mask apertures, each time successive ones of the rotating apertures are aligned and in communication with the continuously applied laser beam, to correspondingly perforate the material, rewinding the perforated material from the mask onto a rewind reel, maintaining the perforated material under the applied tension as the sheet of material is rewound, and holding the web under proper tension whenever the web is not being advanced.

By perforating with the laser beams the tipping material as it unwinds from a single bobbin which has already been formed by slitting a parent roll in the manner previously described, it will be appreciated that this particular reversal of steps in comparison to the noted conventional approach wherein the tipping material is perforated prior to being slit facilitates the reliable and economical use of laser beams with respect to successfully perforating cigarette tipping material.

While the invention has been described in connection with preferred embodiments, it is not intended to limit the invention to the particular forms set forth above but, on the contrary, it is intended to cover such alternatives, modifications and equivalents as may be included within the spirit and scope of the invention as defined by the appended claims.

What is claimed is:

1. A process for perforating material comprising the steps of:
   a. advancing at least a sheet of material along a path of travel,
   b. passing the advancing material over a movable laser mask having an aperture such that the material drives the mask in unison with the movement of the material, and
   c. directing at least a laser beam through the corresponding aperture so as to vaporize the material juxtaposed the mask aperture to correspondingly form an opening in the material.

2. A process as set forth in claim 1 wherein said step of directing a laser beam includes continuously directing the laser beam at the mask for enabling communication with the aperture.

3. A process for perforating cigarette tipping paper comprising the steps of:
   a. advancing a web of tipping paper generally having the width range of a single bobbin of tipping paper along a path of travel,
   b. passing the advancing web of paper over a movable laser mask having an aperture such that the web drives the mask in unison with the movement thereof, and
   c. directing at least one laser beam through the corresponding aperture so as to vaporize the web of paper juxtaposed the mask aperture to correspondingly form an opening in the web of paper.

4. A process for perforating cigarette tipping material comprising the steps of:
   a. advancing a web of tipping material along a path of travel,
   b. passing the advancing material over and in contact with a cylindrical laser mask having a plurality of circumferential apertures such that the material rotatably drives the mask in unison with the movement of the material such that successive ones of the apertures are juxtaposed the web, and
   c. directing at least one laser beam through corresponding ones of successively rotating apertures so as to vaporize the material juxtaposed such mask aperture to correspondingly form an opening in the material 5. A process as set forth in claim 4 in which said step of directing a laser beam includes continuously directing the laser beam at the mask for enabling communication with the aperture.

6. A process for perforating a web of sheet-like material comprising the steps of:
   a. unwinding at least a sheet of the material from a supply reel along a path of travel,
   b. tensioning the material as it unwinds from the supply reel,
   c. advancing the material over and in contact with at least one generally hollow rotatable cylindrical laser mask having a plurality of circumferentially spaced apertures such that the material rotatably drives the mask in unison with the movement of the material,
   d. guiding and tensioning the material over the laser mask as it advances along the path of travel, and said tensioning being such as to insure that said mask is rotated by said material with substantially no relative movement between said mask and said material, e. directing at least one uninterrupted continuously applied laser beam from within the hollow mask toward the corresponding apertures so as to vaporize the material juxtaposed each of the mask apertures, each time successive ones of the rotating apertures are aligned and in communication with the continuously applied laser beam to correspondingly perforate the material, f. rewinding the perforated material from the mask onto a take-up reel, and g. maintaining the perforating material under the applied tension as the sheet of material is rewound.

7. A process as set forth in claim 6 which further includes the step of holding the web under proper tension whenever the web is not being advanced.

8. Apparatus for perforating material as it is advanced along a path of movement comprises first means for advancing the material along the path of movement, second means having at least one aperture and being operatively associated with said first, means for enabling the perforation of the material as if it is advanced along the path, said second means being movable and being driven in unison with the advancing material solely by its cntact therewith, and third means operatively associated with the second means for vaporizing material juxtaposed said aperture.

9. The apparatus as set forth in claim 8 in which said third means is comprised of laser means for directing at least one laser beam to said one aperture, such that the laser beam vaporizes the material juxtaposed said aperture.

10. apparatus as set forth in claim 8 in which said second means is comprised of at least one rotatable and hollow mask member having a plurality of circumferentially spaced apertures for enabling the formation of corresponding openings in the material.

11. The apparatus as set forth in claim 10 in which said third means is comprised of laser means for continuously directing at least one laser beam from the interior of the hollow mask such that respective ones of said apertures successively communicate with said beam as the hollow mask is rotated by the material so as to correspondingly vaporize the material juxtaposed respective ones of said apertures which are in communication with said beam.

12. The apparatus as set forth in claim 11 in which said second means further includes guiding and tension maintaining means for guiding the movement of the material relative to said hollow mask so that the material does not laterally slip relative to said mask member and for maintaining the tension on the material as it advances so as to avoid slippage on said mask.

13. The apparatus as set forth in claim 12 in which said guiding and tensioning maintaining means is comprised of guide rolls, said guide rolls being positioned with respect to said movable hollow mask so as to maintain the tension on the material necessary to prevent slippage of the material relative to said hollow mask.

14. The apparatus as set forth in claim 10 in which said first means comprises unwinding means including a shaft for enabling the material to be unwound and advanced along the path; and tension controlling means for controlling the tension of the material as it is advanced for inhibiting slippage of the material with respect to said mask.

15. The apparatus as set forth in claim 14 in which said tension control means includes an adjustable brake device which applies varying amounts of braking force to said shaft so as to apply proportionately varying tension to the material.

16. The apparatus as set forth in claim 14 in which said first means includes rewinding means having frame means, drive roller means supported by said frame means for advancing the material along the path and a rewind reel pivotally connected to said frame for continuously storing convolutions of the material being rewound thereon as said roller means advances the material from said unwinding means such that the rewound material on said rewind reel actually engages the advanced material located on said roller; and tension maintaining means operatively connected to said reel for applying a constant pressure to the advancing material on said roller for downwardly urging the material to thereby maintain tension on the material as it is advanced along the path.

17. The apparatus as set forth in claim 16 in which said first means includes holding means for selectively holding the material on said roller means to thereby maintain the tension on the material when said roller means no longer drivingly advances the material.

18. The apparatus of claim 16 in which said tension maintaining means includes a fluid cylinder having a rod operatively connected to said rewind reel and being pressurizable to urge said rod downwardly and said rewind reel downwardly and into engagement with the advancing material on said roller, and means for controlling the bleed of pressurized fluid from said cylinder so as to control the rate of vertically upward displacement of said rod in response to said rewind reel having the diameter increase as a result of convolutions of material being wrapped on said rewind reel.

19. The apparatus, as set forth in claim 10 in which said second means includes laser means and further includes shielding means having a shield member movable between first and second positions, such that whenever in said first position said shield is in the laser shielding position, and whenever in the second position is spaced from said hollow mask member such that the material may be threaded on or removed from said mask member.

20. The apparatus as set forth in claim 19 in which said shield member is configured to partially encompass a peripheral portion of said hollow mask whenever in said first position for shielding against the laser beam.

21. Apparatus for perforating material as it is advanced along a path of movement comprises first means for advancing the material along the path of movement, second means operatively connected to said first means including a rotatable generally hollow masking member having a plurality of spaced apertures for enabling the perforation of the material as it is advanced along the path and for being rotatably driven in unison with the advancing material solely by its contacts therewith, and laser means being operatively associated interiorly of said masking member for directing a continuous beam of laser energy in a direction such that as said mask is rotatably driven preselected ones of the apertures successively communicate with the beam so as to enable the beam to vaporize material juxtaposed said preselected ones of said apertures.

22. Apparatus for perforating material as it is advanced along a path of movement comprises first means for advancing the material along the path of movement, said first means comprising unwinding means including a supply reel mounted on a shaft for enabling the material to be unwound and advanced along the path; and tension controlling means for controlling the tension of the material as it is advanced for inhibiting slippage, rewinding means having frame means, drive roller means supported by said frame means for advancing the material along the path and a rewind reel pivotally connected to said frame for continuously storing convolutions of the material being rewound thereon as said roller means advances the material from said unwinding means such that the rewound material on said rewind reel actually engages the advancing material located on said roller; and tension maintaining means operatively connected to said reel for applying a constant pressure to the advancing material on said roller for downwardly urging the material to thereby maintain tension on the material as it is advanced along the path, and holding means for selectively holding the material on said roller means to thereby maintain the tension on the material when said roller means no longer drivingly advances the material, said tension maintaining means includes a fluid cylinder having a rod operatively connected to said rewind reel and being pressurizable to urge said rod downwardly and said reel downwardly and into engagement with the advancing material on said roller, and means for controlling pressurized fluid from said cylinder so as to control the rate of vertically upward displacement of said rod in response to said rewind reel having the diameter increase as a result of convolutions of material being wrapped on said rewind reel; second means associated with said first means for enabling the perforation of the material as it is advanced along the path, said second means being comprised of at least one rotatable and hollow mask member being driven by and in unison with the advancing material, and having a plurality of circumferentially spaced apertures for enabling the formation of corresponding openings in the material, guiding and tension maintaining means for guiding the movement of the material relative to said hollow mask so that the material does not laterally slip relative to said mask member and for maintaining the tension applied by said tension controlling means on the material as it advances so as to avoid slippage, said guiding and tension maintaining means is comprised of guide rolls, said guide rolls being positioned with respect to said movable hollow mask so as to prevent slippage of the material relative to said hollow mask, said guide rolls, said rotatable hollow mask, and said rewind and supply reel being cantilevered so as to enable threading of the material, and shielding means having a curved U-shaped shield member movable between first and second positions, such that whenever in said first position said shield is in the laser shielding position, and whenever in the second position is spaced from said hollow mask member such that the material may be threaded on or removed from said mask member, and stationary laser means operatively associated with the second means, said laser means continuously directing at least one laser beam from the interior of the hollow mask such that respective ones of said apertures communicating with said beam, as said hollow mask is rotated by the material, correspondingly enables the material juxtaposed respective ones of said apertures which are in communication with said beam to be vaporized.

23. Apparatus for perforating material as it is advanced along a path of movement comprises first means for advancing the material along the path of movement, said first means comprising unwinding means including a supply reel mounted on a shaft for enabling the material to be unwound and advanced along the path; and tension controlling means for controlling the tension of the material as it is advanced for inhibiting slippage, rewinding means having frame means, drive roller means supported by said frame means for advancing the material along the path and a rewind reel pivotally connected to said frame for continuously storing convolutions of the material being rewound thereon as said roller means advances the material from said unwinding means such that the rewound material on said rewind reel actually engages the advanced material located on said roller; and tension maintaining means operatively connected to said reel for applying a constant pressure to the advancing material on said roller for downwardly urging the material to thereby maintain tension on the material as it is advanced along the path, and holding means for selectively holding the material on said roller means to thereby maintain the tension on the material when said roller means no longer drivingly advances the material; second means associated with said first means for enabling the perforation of the material as it is advanced along the path, said second means being comprised of at least one rotatable and hollow mask member being driven by and in unison with the advancing material, and having a plurality of circumferentially spaced apertures for enabling the formation of corresponding openings in the material, guiding and tension maintaining means for guiding the movement of the material relative to said hollow mask so that the material does not laterally slip relative to said mask member and for maintaining the tension applied by said tension controlling means on the material as it advances so as to avoid slippage, and shielding means having a curved U-shaped shield member movable between first and second positions, such that whenever in said first position said shield is in the laser shielding position, and whenever in the second position is spaced from said hollow mask member such that the material may be threaded on or removed from said mask member, and stationary laser means operatively associated with the second means, said laser means continuously directing at least one laser beam from the interior of the hollow mask such that respective ones of said apertures communicating with said beam, as said hollow mask is rotated by the material, correspondingly enables the material juxtaposed respective ones of said apertures which are in communication with said beam to be vaporized.

24. A process for perforating cigarette tipping paper comprising the steps of:
  a. advancing a web of tipping paper having the width range of a standard bobbin along a path of travel,
  b. passing the advancing material over a cylindrical laser mask having a plurality of circumferential apertures such that the material rotatably drives the mask in unison with the movement of the material such that successive ones of the apertures are juxtaposed the web, and
  c. directing at least one laser beam through corresponding ones of successively rotating apertures so as to vaporize the material juxtaposed such mask aperture to correspondingly form an opening in the material.

25. A process as set forth in claim 24 in which said step of directing a laser beam includes continuously directing the laser beam at the mask for enabling communication with the aperture.

26. A process for perforating a web of cigarette tipping paper material having the width range of a single bobbin comprising the steps of:
 a. unwinding at least a web of the material from a supply reel along a path of travel,
 b. tensioning the material as it unwinds from the supply reel,
 c. advancing the material over at least one generally hollow cylindrical laser mask having a plurality of circumferentially spaced apertures such that the material rotatably drives the mask in unison with the movement of the material,
 d. guiding and tensioning the material over the laser mask as it advances along the path of travel,
 e. directing at least one uninterrupted continuously applied laser beam from within the hollow mask toward the corresponding apertures so as to vaporize the material juxtaposed each of the mask apertures, each time successive ones of the rotating apertures are aligned and in communication with the continuously applied laser beam to correspondingly perforate the material,
 f. rewinding the perforated material from the mask onto a rewind reel, and
 g. maintaining the perforating material under the applied tension as the web of material is rewound.

27. A process as set forth in claim 26 which further includes the step of holding the web under proper tension whenever the web is not being advanced.

28. A process for perforating a web of sheetlike material comprising the steps of:
 a. unwinding at least a sheet of the material from a supply reel along a path of travel,
 b. tensioning the material as it unwinds from the supply reel,
 c. advancing the material over and in contact with at least one generally hollow rotatable cylindrical laser mask having a plurality of circumferentially spaced apertures such that the material rotatably drives the mask in unison with the movement of the material,
 d. guiding and tensioning the material over the laser mask as it advances along the path of travel, and said tensioning being such as to insure that said mask is rotated by said material with substantially no relative movement between said mask and said material, and
 e. directing at least one uninterrupted continuously applied laser beam from within the hollow mask toward the corresponding apertures so as to vaporize the material juxtaposed each of the mask apertures, each time successive ones of the rotating apertures are aligned and in communication with the continuously applied laser beam to correspondingly perforate the material.

29. The process of claim 28 in which the web of sheet material comprises cigarette tipping paper of bobbin width.

* * * * *